(12) United States Patent
Roth et al.

(10) Patent No.: US 10,232,914 B1
(45) Date of Patent: Mar. 19, 2019

(54) PRESSURE ACTIVATED TIME-DELAYED RELEASE

(71) Applicant: SPAWAR Systems Center Pacific, San Diego, CA (US)

(72) Inventors: Leif E. Roth, San Diego, CA (US); Ryan J. Halonen, Durango, CO (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/914,140

(22) Filed: Mar. 7, 2018

(51) Int. Cl.
*B66C 1/34* (2006.01)
*B63B 22/08* (2006.01)
*B63B 21/08* (2006.01)
*A01K 69/08* (2006.01)
*B63B 35/26* (2006.01)

(52) U.S. Cl.
CPC .............. *B63B 22/08* (2013.01); *B63B 21/08* (2013.01); *A01K 69/08* (2013.01); *B63B 35/26* (2013.01)

(58) Field of Classification Search
CPC ................................. B63B 22/08; B63B 21/08
USPC .......................... 294/66.1, 82.28, 82.34, 202
See application file for complete search history.

(56) References Cited

U.S. PATENT DOCUMENTS

| | | | |
|---|---|---|---|
| 3,013,835 A * | 12/1961 | Blatt | B25J 15/0206 164/404 |
| 3,262,173 A * | 7/1966 | Pickens | B63B 22/06 102/413 |
| 3,463,226 A * | 8/1969 | Johnson | B25J 9/144 166/351 |
| 3,628,821 A | 12/1971 | Reece | |
| 4,148,514 A * | 4/1979 | McCullough | B66C 1/34 294/82.34 |
| 4,185,864 A * | 1/1980 | Phillips | B66C 1/34 294/66.1 |
| 4,402,133 A * | 9/1983 | Cribbs | H01R 43/205 29/252 |
| 4,463,496 A * | 8/1984 | Reich | B23D 29/002 114/221 A |
| 4,729,588 A * | 3/1988 | Kratzer | B25J 15/028 294/115 |
| 4,768,128 A | 8/1988 | Jankowiak | |
| 4,805,547 A * | 2/1989 | Matsuzaki | B63C 11/50 114/221 A |

(Continued)

*Primary Examiner* — Paul T Chin
(74) *Attorney, Agent, or Firm* — SPAWAR Systems Center Pacific; Kyle Eppele

(57) ABSTRACT

A pressure activated time-delayed release device and method. The device includes a body having a drive chamber and a compression chamber disposed therein, a drive piston disposed within the drive chamber of the body, and a compression piston disposed within the compression chamber of the body. A throttle mechanism is disposed between the drive piston and the compression piston. The throttle mechanism controls a release of viscous fluid from the drive chamber into the compression chamber. The drive piston and compression piston are connected so as to cause the compression piston to move substantially simultaneously with the drive piston to compress a compressible element disposed within the compression chamber. The device moves from an un-actuated state to an actuated state when the device is exposed to a predetermined water pressure for a predetermined period of time.

20 Claims, 5 Drawing Sheets

(56) References Cited

U.S. PATENT DOCUMENTS

| | | | |
|---|---|---|---|
| 4,826,229 A * | 5/1989 | Smith | B63B 21/58 |
| | | | 114/252 |
| 4,903,382 A | 2/1990 | Held | |
| 4,909,321 A | 3/1990 | Petree | |
| 5,184,328 A | 2/1993 | Dumestre, III | |
| 5,234,244 A * | 8/1993 | Kim | B25J 15/0206 |
| | | | 294/115 |
| 6,367,856 B1 * | 4/2002 | Jasperse | B25J 9/144 |
| | | | 294/116 |
| 8,943,699 B2 * | 2/2015 | Strohmeier | B23D 27/02 |
| | | | 30/228 |
| 2017/0297655 A1 | 10/2017 | Pearlman | |

\* cited by examiner

PRESSURE ACTIVATED TIME-DELAYED RELEASE

STATEMENT OF GOVERNMENT INTEREST

Federally-Sponsored Research and Development

The United States Government has ownership rights in this invention. Licensing inquiries may be directed to Office of Research and Technical Applications, Space and Naval Warfare Systems Center, Pacific, Code 72120, San Diego, Calif., 92152; telephone (619) 553-5118; email: ssc pac t2@navy.mil. Reference Navy Case No. 103,307.

BACKGROUND OF THE INVENTION

Field of Invention

This disclosure relates to releases, and more particularly, time-delayed underwater releases of objects.

Description of Related Art

Previous methods for mechanical time-delayed releases at underwater depths often relied on galvanic action. Galvanic action involves a link that corrodes when submerged in an electrolyte-like sea water. Since the corrosive process takes time, a time-delayed release is achieved. This galvanic action technique has drawbacks. First, it cannot be used in fresh water. Second, the predictability of the timer is lost with variations in ocean temperatures, salinity, and other ocean conditions. Third, there are consumables that need to be replaced with each use. Fourth, this technique is susceptible to premature corrosion when exposed to moisture before use.

Another prior art method of achieving a time-delayed release is to electronically sense the desired environment and use a digital timer to determine when to electronically activate the release via, e.g., a burn wire or servo. This method also has drawbacks. First, it requires costly electronics. Second, it relies on battery power, and is less reliable. Third, activation energy must be stored in the device rather than obtaining activation energy from the environment.

Accordingly, there is a need for a more predictable means to achieve time-delayed release that can be used in water. There is further a need for a means to achieve time-delayed release that does not require replacement of consumables with each use and that does not require costly electronics.

BRIEF SUMMARY OF INVENTION

The present disclosure addresses the needs noted above by providing a pressure activated time-delayed release device and method. In accordance with one embodiment of the present disclosure, a pressure activated time-delayed release device is provided. The device comprises a body having a drive chamber and a compression chamber, and a drive piston disposed within the drive chamber of the body. The drive piston is coupled to a piston attachment mechanism.

A compression piston is disposed within the compression chamber of the body, the compression piston being coupled to the piston attachment mechanism. A viscous element is disposed between the drive piston and the compression piston. The drive piston is capable of moving the piston attachment mechanism, thus causing the compression piston to move substantially simultaneously with the drive piston. The device also includes a compressible element disposed within the compression chamber.

A throttle mechanism is disposed between the drive piston and the compression piston, the throttle mechanism being configured to restrict a flow of the viscous element from the drive chamber into the compression chamber.

An actuation mechanism is coupled to the piston attachment mechanism. The actuation mechanism is capable of moving between an un-actuated state and an actuated state based on the position of the piston attachment mechanism. The actuation mechanism moves to an actuated state when the device is exposed to a predetermined water pressure for a predetermined period of time.

A release of the viscous element through the throttle mechanism is configured to delay the movement of the actuation mechanism to a fully actuated state for the predetermined period of time.

These, as well as other objects, features and benefits will now become clear from a review of the following detailed description, the illustrative embodiments, and the accompanying drawings.

DETAILED DESCRIPTION OF THE INVENTION

This invention provides a device and method for release of a line, weight, float, spring or other object that may be submerged, released and recovered. For example, those who collect oceanographic data may wish to place an instrument into the water, have the instrument record data, and recover the instrument at a later date or time. Also by way of example, fish could swim into a temporary habitat. The fish could be studied and released at a later time when the temporary habitat is at a predetermined pressure for a predetermined amount of time. In fact, the device and method can be used to release many types of underwater objects so that they may be recovered at a later time.

The device includes a body having a drive chamber and a compression chamber disposed therein, a drive piston disposed within the drive chamber of the body, and a compression piston disposed within the compression chamber of the body. A throttle mechanism is disposed between the drive piston and the compression piston. The throttle mechanism controls a release of viscous fluid from the drive chamber into the compression chamber. The drive piston and compression piston are connected so as to cause the compression piston to move substantially simultaneously with the drive piston to compress a compressible element disposed within the compression chamber. The device moves from an un-actuated state to an actuated state when the device is exposed to a predetermined water pressure for a predetermined period of time.

Figure 1A:
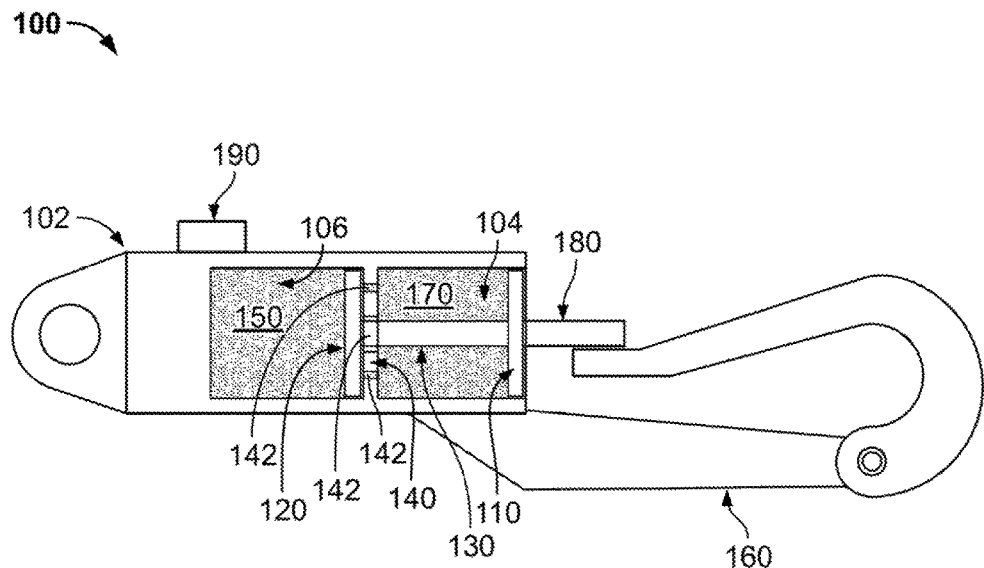
FIG. 1A is a cutaway view of the pressure activated time-delayed release in an un-actuated state, in accordance with one embodiment of the present disclosure.

FIG. 1A is a cutaway top view of the pressure activated time-delayed release 100 in an un-actuated state, in accordance with one embodiment of the present disclosure. As shown in FIG. 1A, the pressure activated time-delayed release device 100 includes a body 102, which may be a substantially cylindrical body. It should also be appreciated that other body shapes are also possible. The drive chamber 104 and compression chamber 106 may be compartments that are disposed within the body 102.

The pressure activated time-delayed release device 100 also includes a drive piston 110 and compression piston 120, which are connected by a piston attachment mechanism 130, such as the shaft that is shown here. The drive piston 110 is disposed in the drive chamber 104 of the body 102. The drive chamber 104 is open to the environmental pressure on one side of the drive piston 110 such that the drive piston 110 may be exposed to, and eventually acted upon by, environmental pressure. Environmental pressure may include water pressure that occurs at underwater depths. The compression piston 120 is disposed within the compression chamber 106 of the body 102. A compressible element 150 is disposed within the compression chamber 106, and a viscous element 170 disposed between the drive piston 110 and the compression piston 120.

The compression piston 120 is coupled to the piston attachment mechanism 130 so that when the drive piston 110 is acted upon by a predetermined water pressure, e.g., pressure at a predetermined underwater depth, the drive piston 110 pushes toward the left side of FIG. 1A. The drive piston 110 thus moves the piston attachment mechanism 130 which, in turn, causes the compression piston 120 to move in a line substantially simultaneously with the drive piston 110. With this motion, the piston attachment mechanism 130 moves until it clears the release mechanism 160, thus causing a release of an object that is held by the release mechanism 160. In the present embodiment, drive piston 110 and compression piston 120 are generally aligned with each other so that they move substantially in a straight line. However, other embodiments, e.g., the one shown in FIGS. 2A-2D are possible.

It should also be understood that release mechanism 160 is not necessary, and that actuation (e.g., electrical actuation) may occur without the release mechanism 160.

The drive piston 110 and compression piston 120 can be composed of one or more rigid materials, such as plastic, metal or wood. It may be desirable for the materials used for the drive piston 110, compression piston 120 and other components to be corrosion-resistant as salt water found in bodies of water, e.g., sea water and ocean water, can be corrosive. In the present embodiment, the drive piston 110 has a substantially circular or disk shape.

Between the drive piston 110 and the compression piston 120 is a throttle mechanism 140. In this embodiment, the throttle mechanism 140 has one or more orifices 142. The drive piston 110 is driven toward the throttle mechanism 140. The orifices of the throttle mechanism 140 restrict the flow of viscous element 170 that flows through throttle mechanism 140. Compressible element 150 is disposed within the compression chamber 106 regardless of whether the device 100 is actuated or un-actuated.

After the pressure activated time-delayed release device 100 is exposed to ocean pressure, the volume that the viscous element 170 occupies will transfer from the drive chamber 104 at one side of the throttle mechanism 140 to the other side of throttle mechanism 140. Release of the viscous element 170 through the throttle mechanism 140 is configured to delay the movement of the actuation mechanism 180 to an actuated state for the predetermined period of time. The predetermined time will vary, according to the design of the pressure activated time-delayed release device 100. Depending on the design, the release process may occur relatively quickly, e.g., in a matter of minutes. Alternatively, the release process could take longer, e.g., in about one month. During this time, the pressure activated time-delayed release device 100 moves from an un-actuated state to an actuated state.

Figure 1B:
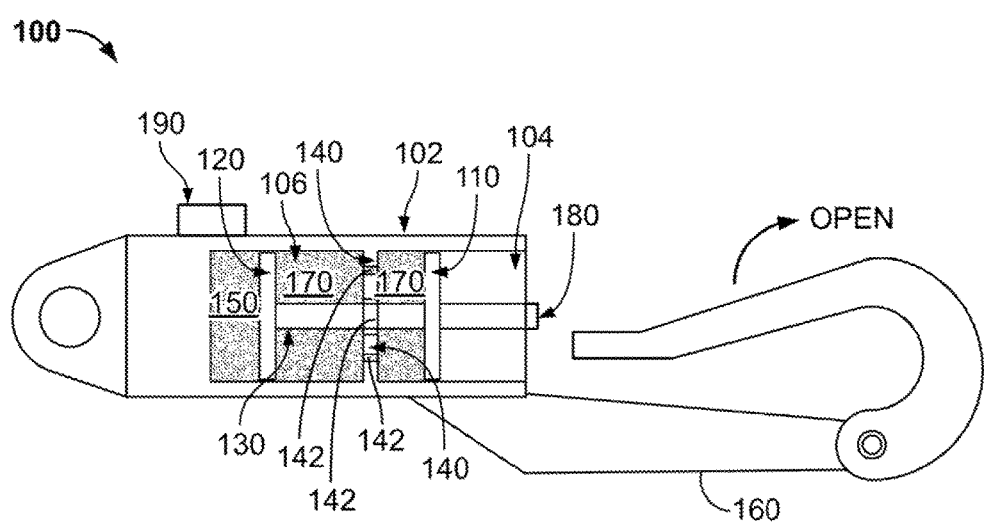
FIG. 1B is the cutaway view of the pressure activated time delayed release in FIG. 1A, after it has moved to an actuated state, in accordance with one embodiment of the present disclosure.

FIG. 1B is a cutaway view of the pressure activated time-delayed release device 100 in an actuated state, in accordance with one embodiment of the present disclosure. As shown in this illustration, the compressible element 150 is compressed when the drive piston 110 is forced toward the left side. The drive piston 110 and the compression piston 120 have moved together so that the compressible element 150 is compressed.

Like the drive piston 110 and the compression piston 120, throttle mechanism 140 may be made of a rigid material, such as plastic, metal or wood. The orifices of throttle mechanism 140 may be made by a drill or by any other means that creates a passage for fluid to flow. The shape and size of the orifices can be designed to obtain the desired activation time for a desired pressure. Alternatively and/or in addition thereto, the throttle mechanism 140 may be formed by any number of methods known in the art, including but not limited to, plastic injection molding, milling, casting, forging and three-dimensional printing.

The compressible element 150 may be chosen based on the desired result. The compressible element 150 may be a gas, e.g., atmospheric air, carbon dioxide or nitrogen. The compressible element 150 may also be a vacuum with a spring, or a foam having air disposed within, by way of non-limiting examples. Air may be desired for ease of assembly as well as its suitability as a compressible element 150.

The pressure activated time-delayed release device 100 uses viscous damping to provide delayed mechanical motion when it is exposed to external ocean pressure. Ocean pressure may vary widely e.g., from twenty-five (25) pounds per square inch (psi) to ten thousand psi. As can be appreciated by one of ordinary skill in the art, the time at which the present pressure activated time delayed release device 100 releases depends on the pressure that it is exposed to, the geometry of the throttle mechanism 140, viscosity of the viscous element 170, initial pressure of the compressible element 150, and compressibility of the compressible element 150.

Before being exposed to water pressure, the pressure activated time-delayed release device 100 will generally remain as shown in FIG. 1A. After the pressure activated time-delayed release device 100 is exposed to water pressure, the water pressure causes the drive piston 110 to be pushed into the pressure activated time-delayed release 100, thus forcing the compression piston 120 to compress the compressible element 150. Throttle mechanism 140 slows the flow of the viscous element 170 from one side of the throttle mechanism 140 to the other. Thus, the time it takes for the piston assembly to move out of the way of release mechanism 160 can be controlled by changing the sizes of the orifices 142 of the throttle plate 140, and/or by changing the viscosity of the viscous element 170.

Drive chamber 104 is divided into two compartments: the left side of the drive piston 110 has the viscous element 170 and the right side is exposed to a pressurized water environment. Compression chamber 106 is also divided into two compartments: the left side of the compression piston 120 has the compressible element 150 and the right side is exposed to the viscous element 170.

It may be desirable for the drive piston 110 and compression piston 120 to have the same diameter. If the drive piston 110 and compression piston 120 were not the same diameter, it is possible that displacement of the fluid in the drive chamber 104 and compression chamber 106 might not occur. In this case, the pressure activated time-delayed release device 100 would not be actuated. The diameters of the drive piston 110 and compression piston 120 are important. The total volume occupied by the viscous element 170 changes as the drive piston 110 and compression piston 120 cycle through their travel. Since the viscous element 170 cannot change volume substantially, the device 100 would not function. The volume of fluid flowing out of the drive side of the throttle mechanism 140 is the area of the drive piston 110 multiplied by the displacement of the drive piston 110. Likewise, the volume of fluid flowing into the compression chamber 106 is the area of the compression piston 120 multiplied by the displacement of the compression piston 120. Since the drive piston 110 and compression piston 120 are connected, they have the same displacement. Therefore, the drive piston 110 and compression piston 120 must have the same diameters to ensure the volume of fluid pushed out of the drive chamber 104 is the same as the volume of fluid received into the compression chamber 106.

The release mechanism 160 may be connected to the piston attachment mechanism 130 via actuation mechanism 180. The release mechanism 160 is capable of moving between a closed configuration and an open configuration based on the position of the piston attachment mechanism 130 and actuation mechanism 180. The pressure activated time-delayed release device 100 moves to an open configuration when the pressure activated time-delayed release device 100 is actuated by being exposed to a predetermined ocean pressure for a predetermined period of time.

In the illustration in FIGS. 1A and 1B, the release mechanism 160 is a pelican hook which is held in place by actuation mechanism 180. In lieu of the release mechanism 160 shown in FIG. 1A, other release mechanisms may be suitable for the present invention, as long as the release mechanism may be actuated. In fact, release mechanism 160 may not be required as long as the release can occur through actuation alone. For example, in lieu of the mechanical release shown, the release mechanism may be electrically activated. Also by way of example, the release mechanism 160 may engage a mechanical switch at a delayed time that connects power to electronics which in turn activate a servo, burn wire, or other electrically activated mechanism. In this case, battery power is not consumed during the time delay. Other actuation mechanisms may also be suitable.

The embodiment shown does not need electronics (which may leak or be ruined in an ocean environment). However, electronics may be used where the appropriate precautions are taken to protect the electronics.

The activation pressure may be a function of the compressibility of the compressible element 150 and the area of the drive piston 110, since pressure equals force divided by area. The force on the drive piston 110 acts to compress the compressible element 150.

A viscous element 170 controls the length of the release from the start of the actuation to the end of the actuation. At full actuation, the release mechanism 160 is fully open and the actuation mechanism 180 is in an actuated state. It should be understood that release mechanism 160 is not necessary, and that actuation mechanism 180 may accomplish the release of an object. The object to be released may be directly captured by the actuation mechanism 180 such that once the drive piston 110 is pushed into the body 102, the object is released. As another example, a blade could be attached to the actuation mechanism 180; the blade could cut a line as the drive piston 110 travels into the body 102. This line may be tethering an object down, such that the object is released when the line is severed.

The viscous element 170 has a viscosity selected to control the time it takes to move the actuation mechanism 180 from an un-actuated state to a fully actuated state. Examples of viscous elements include oil for car shocks, honey and water.

When the viscous element 170 is thick it takes a longer time to go through the throttle mechanism 140 and the release takes longer. On the other hand, when the viscous element 170 is thin, then it takes less time to go through the throttle mechanism 140, thus making for a quicker release.

The actuation mechanism 180 may be a pull actuation mechanism which, when actuated, pulls into the body 102 of the pressure activated time-delayed release device 100. Alternatively, the actuation mechanism 180 may be a push actuation mechanism which, when actuated, pushes away or extends from the body 102 of the pressure activated time-delayed release device 100.

Compressible element 150 becomes compressed as the compression piston 120 is pushed further into the body 102 by the drive piston 110. The drive piston 110 is being pushed into the body 102 by environmental pressure. The compressible element 150 occupies the volume on the right side of the compression piston 120, and the viscous element 170 occupies the right side of the compression piston 120.

The viscous element 170 occupies the space between the drive piston 110 and the compression piston 120. Therefore, when the pressure activated time-delayed release device 100 is in the actuated state, the viscous element 170 is in the drive chamber 104 and the compression chamber 106.

A lockout mechanism 190 (which may be in the form of a button) may be added to permit testing of the invention in the lab prior to deploying the release. Also by way of the example, the lockout mechanism 190 may prevent the pressure activated time-delayed release device 100 from activating until it is ready to be deployed. When the user is ready to deploy the pressure activated time-delayed release device 100, the user could deactivate the lockout mechanism 190. More particularly, prior to the deployment, the user may de-activate the lockout mechanism 190 that prevents the actuation mechanism 180 from moving from an un-actuated state to an actuated state.

Various equations govern operation of the pressure activated time-delayed release. The force needed to act on the drive piston is as follows:

$$P_o \times A_p = F \quad \text{(Equation 1)}$$

where $P_o$=outside pressure, $A_P$=area of piston and F=force acting on piston.

The total area needed for the orifices 142 of the throttle mechanism 140 may be calculated as follows:

$$A = \sqrt{\frac{\rho}{2P}} \frac{Q}{C_d} \quad \text{(Equation 2)}$$

where A=total are of orifices, Q=volumetric flow rate (use time and change in volume, $\rho$=density of fluid, P=pressure differential across throttle plate (changes during cycle), and $c_d$=discharge coefficient for orifice shape.

The following equation shows the relationship between the starting pressure and volume of the compressible element, and the volume of the compressible element when exposed to pressure in its intended environment. This can be used to determine the travel of the actuation mechanism:

$$P_1 V_1 = P_2 V_2 \text{ (for ideal gas)} \quad \text{(Equation 3)}$$

where $P_1$=initial pressure of fluid, $V_1$=initial volume of fluid, $P_2$=final pressure of fluid, $V_2$=final volume of fluid.

Figure 2A:
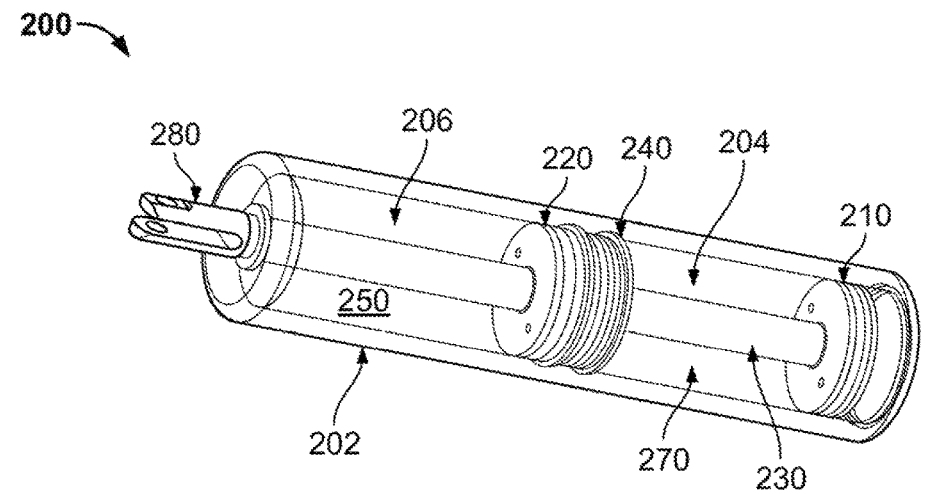
FIG. 2A is a perspective view of a pressure activated time-delayed release device with a push activation in its un-actuated state, in accordance with one embodiment of the present disclosure.
Figure 2B:
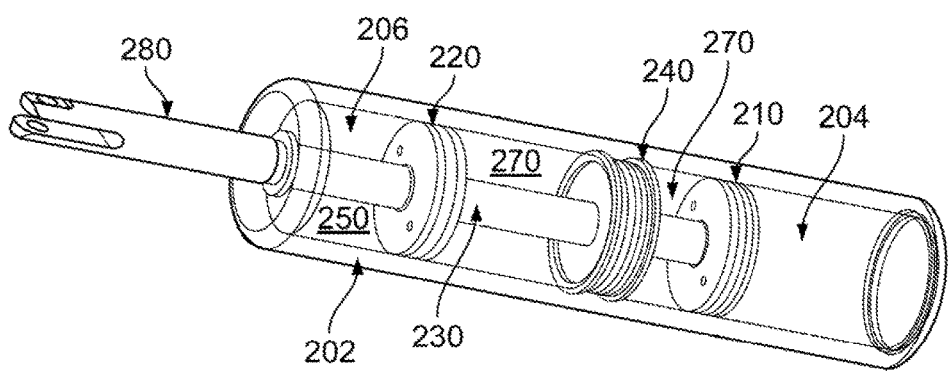
FIG. 2B is a perspective view of a pressure activated time-delayed release device with a push activation in its actuated state, in accordance with one embodiment of the present disclosure.
Figure 2C:
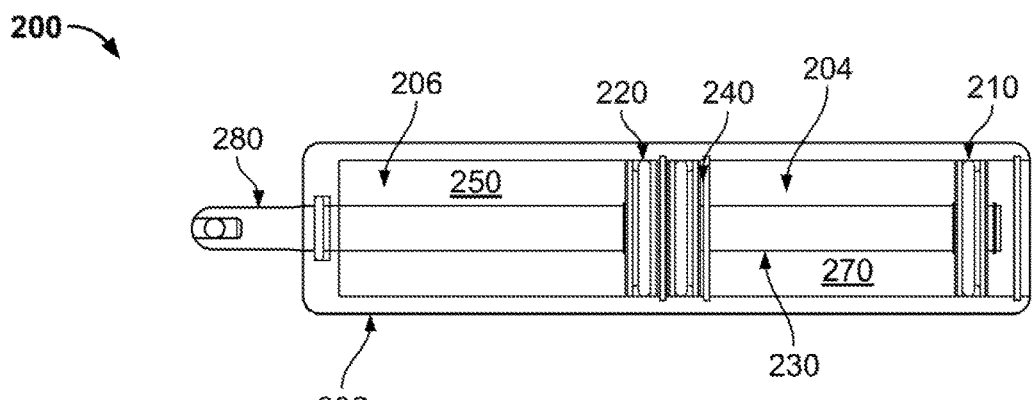
FIG. 2C is a side view of a pressure activated time-delayed release device with a push activation in its un-actuated state, in accordance with one embodiment of the present disclosure.
Figure 2D:
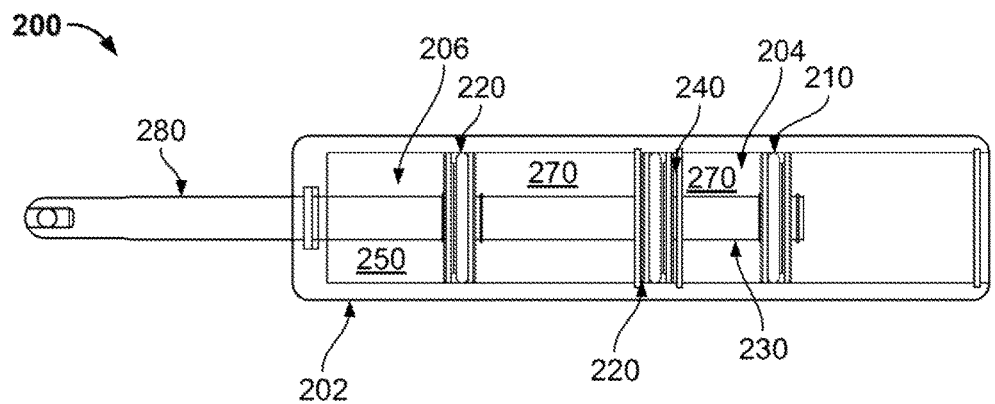
FIG. 2D is a side view of a pressure activated time-delayed release device with a push activation in its actuated state, in accordance with one embodiment of the present disclosure.

FIGS. 2A-2D illustrate another embodiment of the pressure activated time-delayed release device. Referring now to FIGS. 2A-2D, together, FIG. 2A is a perspective view of a pressure activated time-delayed release device 200 with a push activation in its closed configuration. FIG. 2B is a perspective view of the pressure activated time-delayed release device 200 with a push activation in its open or released configuration. FIG. 2C is a side view of the pressure activated time-delayed release device 200 with a push activation in its closed configuration. FIG. 2D is a side view of a pressure activated time-delayed release device 200 with a push activation in its open or release configuration.

Similar to FIGS. 1A-1B, this version of the pressure activated time delayed release device 200, shown in FIGS. 2A-2D, includes a body 202, a drive chamber 204, a compression chamber 206, a drive piston 210 and compression piston 220, which are connected by a piston attachment mechanism 230, such as the shaft that is shown here. The drive piston 210 is disposed in the drive chamber 204 of the body 202. The compression piston 220 is disposed within the compression chamber 206 of the body 202. A compressible element 250 is disposed within the compression chamber 206, and a viscous element 270 occupies the open space between the drive piston 210 and the compression piston 220. The viscous element 270 flows from one side of the throttle mechanism 240 to the other.

The compression piston 220 is coupled to the piston attachment mechanism 230 so that when the drive piston 210 is acted upon by a predetermined ocean pressure, the drive piston 210 pushes toward the left side of FIGS. 2A-2D, thus moving the piston attachment mechanism 230 which, in turn, causes the compression piston 220 to move in a line substantially simultaneously with the drive piston 210. With this motion, the actuation mechanism 280 moves until it clears the object to which it is attached, thus causing a release of the object that was formerly held by the actuation mechanism 280. In the present embodiment, drive piston 210 and compression piston 220 are generally aligned with each other so that they move in a substantially straight line.

Other examples of how actuation may be effected include moving the actuation mechanism 280 to cover a sensor so that the sensor is protected until a desired time has passed. For example, a user could lower a camera into the ocean with a cover on it to prevent biological growth from growing on the lens. This time-delayed actuation method could push the cover off, exposing a clean lens to capture footage at a delayed time. Another example of using this mechanism would be to puncture a compressed canister, and inflate a buoy that would float a device back to the surface after it has time to record data on the sea floor. This mechanism could be used any time that motion at a delayed time is desired in a pressurized environment.

This version of the device is similar to the device of FIGS. 1A-1B, except that, in FIGS. 2A-2D, it uses the activation method to push the piston attachment mechanism 230 rather than pull the piston attachment mechanism 230. One can see that the actuation mechanism 280 comes out from the opposite end as the drive piston 210. There is pressure pushing the piston attachment mechanism 230 back in, but since the drive piston 210 is a larger area, the net result is force pushing the actuation mechanism 280 out.

Figure 3:
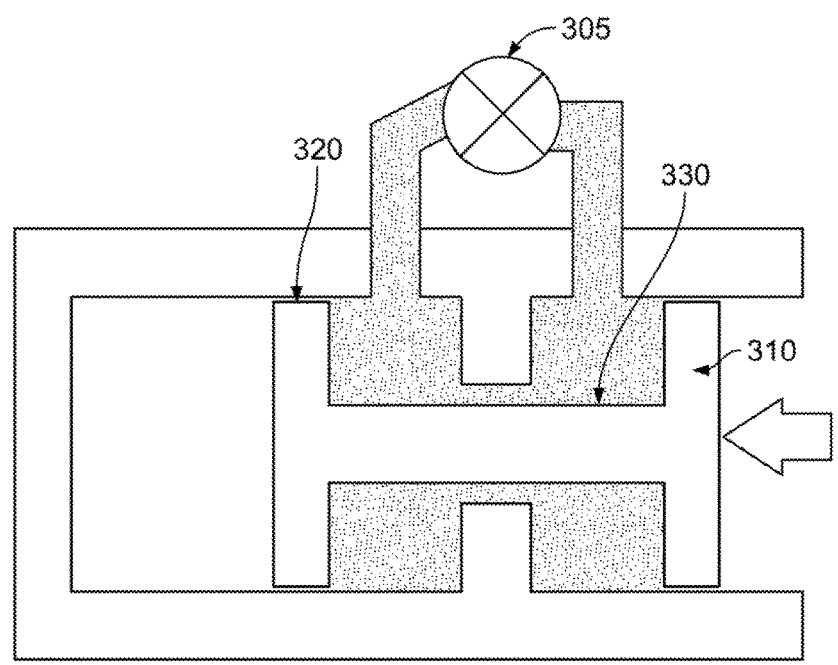
FIG. 3 illustrates an external bypass that may be used with the pressure activated time-delayed release device, in accordance with one embodiment of the present disclosure.

The throttle plate may be replaced with a plate that has no orifices. Referring now to FIG. 3, illustrated is an external bypass 305 that may be used with the pressure activated time-delayed release device in accordance with one embodiment of the present disclosure. In this embodiment, the throttle plate of FIGS. 1A-1B and 2A-2D has been replaced with a plate that has no orifices. The viscous fluid or viscous element must flow from one side to the other through the external bypass 305. This external bypass 305 resides between the drive piston 310 and the compression piston 320. The external bypass 305 has a valve that throttles the flow of the fluid. This embodiment allows the time delay to be adjusted without having to change the throttle plate. Also, the valve could be fully closed to lock out travel of the pistons 310, 320 when actuation is not desired.

The pressure activated time-delayed release may take several forms. In FIGS. 1A and 1B, the pressure activated time-delayed release device had both pistons moving in a line. However, other embodiments are possible, including an arrangement or configuration where the pistons move around a substantially central axis such as is described below and shown in FIGS. 4A and 4B.

Figure 4A:
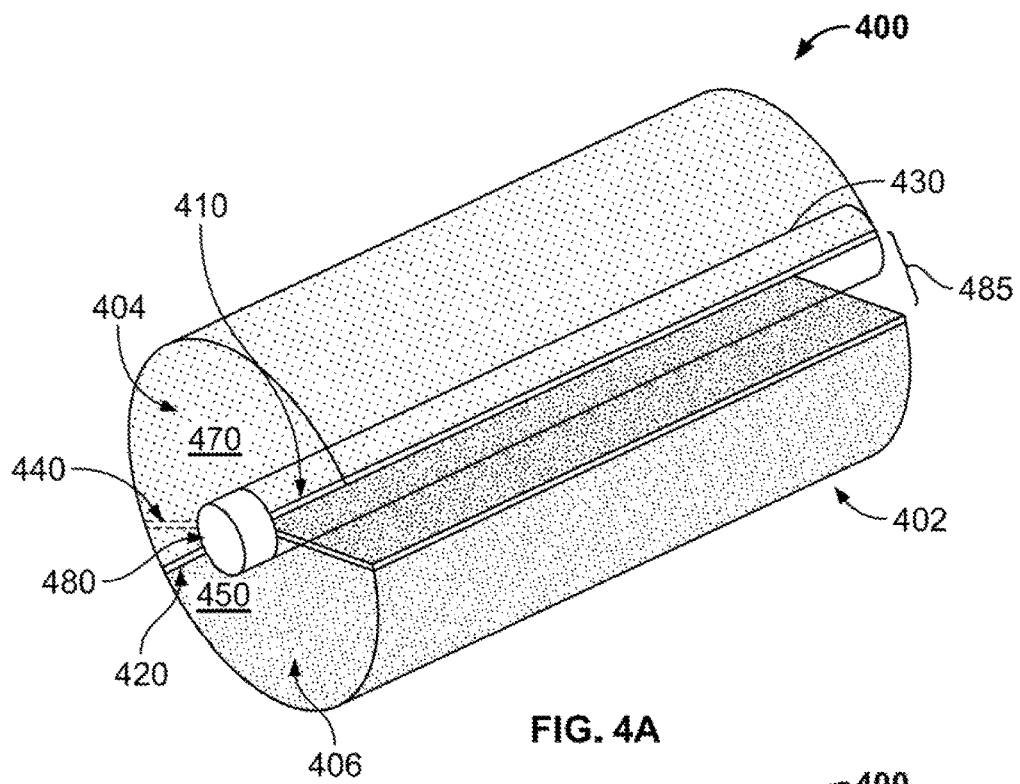
FIG. 4A is a perspective view of the pressure activated time-delayed release in an un-actuated state, in accordance with one embodiment of the present disclosure.

FIG. 4A is a perspective view of the pressure activated time-delayed release device 400 in an un-actuated state where the pistons revolve around a central axis, in accordance with one embodiment of the present disclosure. As with the other embodiments of the pressure activated time-delayed release device that are described herein, this embodiment of the pressure activated time-delayed release device 400 includes a body 402, a drive chamber 404 and a compression chamber 406.

The drive piston 410 and compression piston 420 are connected by a piston attachment mechanism 430, such as shaft. The drive piston 410 is disposed within the drive chamber 404. The compression piston 420 is disposed within the compression chamber 406 of the body 402. The compression piston 420 is coupled to the piston attachment mechanism 430. The drive piston 410 is capable of moving the piston attachment mechanism 430 which, in turn, causes the compression piston 420 to move substantially simultaneously with the drive piston 410.

Figure 4B:
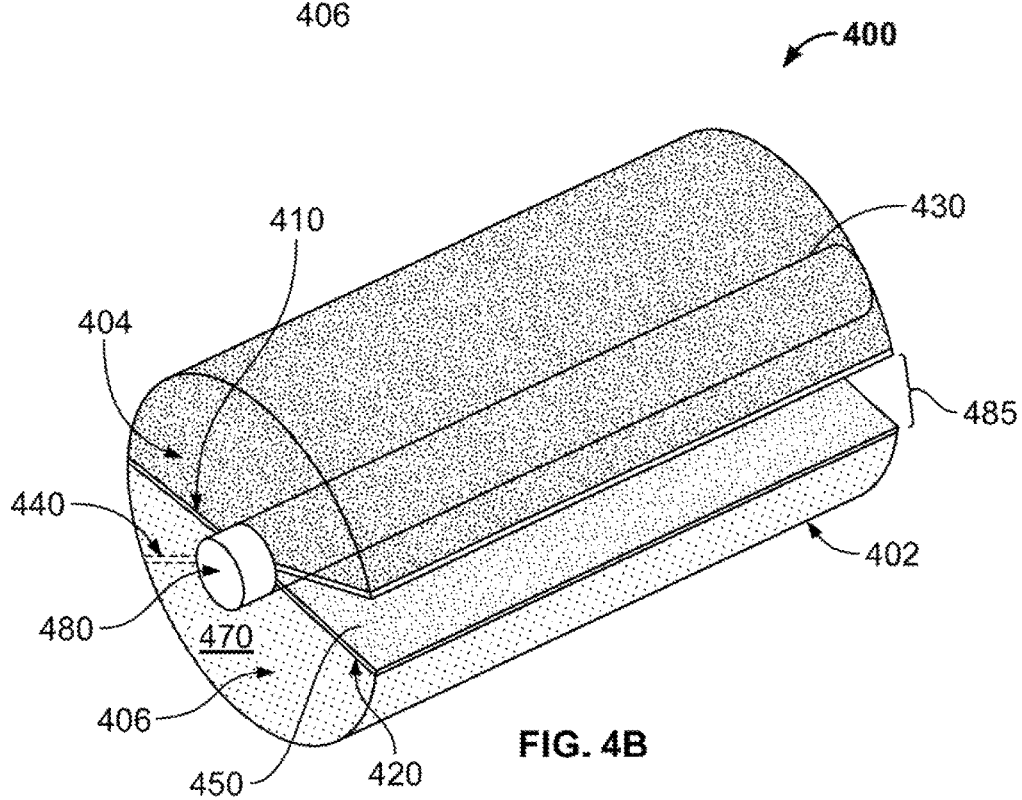
FIG. 4B is a perspective view of the pressure activated time-delayed release in an actuated state, in accordance with one embodiment of the present disclosure.

The drive piston 410 and compression piston 420 can be made of a rigid material, such as plastic, metal or wood. The material may also be water-resistant. It may be desirable for the materials used for the drive piston 410, compression piston 420 and other components to be corrosion-resistant. In FIGS. 4A and 4B, the drive piston 410 can have something of a paddle wheel shape that sweeps around a central axis and makes continuous contact with the outer wall. Its motion resembles a revolving door. The area of this paddle wheel shape can be used to dial in the activation pressure, since pressure equals force divided by area. It may also be desirable for the drive piston 410 and compression piston 420 to have a seal of some type, e.g., an apex seal, so that water does not penetrate the drive piston 410 or compression piston 420.

As can be appreciated by one of ordinary skill in the art, because of the connecting piston attachment mechanism 430, the drive piston 410 and compression piston 420 move together. The bigger the piston attachment mechanism 430, the smaller the area for the viscous element 470.

Between the drive piston 410 and the compression piston 420 is a throttle mechanism 440, which is a throttle plate having orifices. The drive piston 410 is driven toward the throttle mechanism 440. The orifices of throttle mechanism 440 restrict the flow of viscous element 470 that flows through throttle mechanism 440. Compressible element 450 is disposed within the compression chamber 406. Compressible element 450 is compressed in the actuated configuration. As with all embodiments herein, the compression chamber 406 is divided into two compartments that are on either side of the compression piston 420. A viscous element 470 is on one side of the compression piston 420, and compressible element 450 is on the other side of the compression piston.

Throttle mechanism 440 is disposed between the drive piston and the compression piston, the throttle mechanism being configured to control a release of viscous fluid/element from the drive chamber into the compression chamber.

Like the drive piston 410 and the compression piston 420, throttle mechanism 440 may be made of a rigid material, such as plastic, metal or wood.

The compressible element 450 may be chosen based on the desired result. The desired result may be rotary actuation that takes a desired amount of time to complete in a given pressurized environment. This rotary motion may be preferred over the aforementioned linear motion in certain applications. For example, it may be desirable to have the pressure activated time delayed release device 400 turn a camera at a delayed time so that two views are obtained. Also by way of example, this rotary motion could sweep a blade through a line and release a buoy. Further by way of example, the pressure activated time-delayed release device 400 could hold an object down and then at a delayed time, a lever (not shown) attached to the piston attachment mechanism 430 could rotate out of the way and release the object.

The compressible element 450 may be a gas, e.g., atmospheric air, carbon dioxide or nitrogen. The compressible element 450 may also be a vacuum with a spring, or a foam having air disposed within, by way of non-limiting examples. Air may be desired for ease of assembly as well as its suitability as a compressible element 450.

The pressure activated time-delayed release device 400 uses viscous damping to provide delayed mechanical motion when it is exposed to external pressure. The pressure may cover a broad range, e.g., twenty-five (25) pounds per square inch (psi) to ten thousand psi. The pressure at which the present pressure activated time-delayed release device 400 releases is chosen depending on when the delayed release is desired.

Before being exposed to pressure, the device 400 will generally remain as shown in FIG. 4A. When exposed to pressure, the drive piston 410 is pushed into the pressure activated time-delayed release device 400, forcing the compression piston 420 to compress the compressible element 450. A throttle mechanism 440 slows the flow of the viscous element 470 from one side of the throttle mechanism 440 to the other. Thus, actuation time can be controlled by changing the orifices of the throttle mechanism 440, and/or by changing the viscosity of the viscous element 470. The actuation mechanism 480 may be the portion of the piston attachment mechanism 430 that protrudes from the pressure activated time-delayed release device 400. The actuation mechanism 480 is capable of moving between a closed configuration in an un-actuated state to an open configuration in an actuated state based on the position of the piston attachment mechanism 430. The piston attachment mechanism 430 may be driven to move (via the drive piston 410) when the pressure activated time delayed release device 400 is exposed to a predetermined external pressure, e.g., ocean pressure, for a predetermined period of time.

FIG. 4B is a perspective view of the pressure activated time-delayed release 400 in an open or released configuration after the device has been actuated, in accordance with one embodiment of the present disclosure. In this illustration, the compressible element 450 is compressed when the drive piston 410 is forced toward a counter-clockwise direction. The drive piston 410 and the compression piston 420 have moved together so that the compressible element 450 compresses. The thickness of viscous element 470 controls the length of the release cycle. The viscous element 470 has a viscosity chosen to control the time of a release of an object by the pressure activated time-delayed release device 400.

Through an opening 485 in the body 402, water pressure is exposed to the drive piston 410 which pushes the drive piston 410 and compression piston 420 around an axis running through the center of the pressure activated time-delayed release device 400. On the other side of drive piston 410 is viscous element 470. Viscous element 470 is pushed through the throttle mechanism 440. Viscous element 470 then flows into the space between the throttle mechanism 440 and the compression piston 420. The compression piston 420, which is coupled to the drive piston 410, compresses the compressible element 450.

FIG. 4B is a perspective view of the pressure activated time-delayed release in an open or released configuration where the pistons revolve around a central axis, in accordance with one embodiment of the present disclosure. As the pressure activated time-delayed release device 400 transitions from the initial state in FIG. 4A to the actuated state illustrated in FIG. 4B, the viscous fluid/viscous element is pumped through the throttle plate by the drive piston 410. The compressible element 450 is compressed by the compression piston 420.

This embodiment uses rotary motion rather than linear motion. Both the compression piston 420 and the drive piston 410 are attached to a piston attachment mechanism 430. The compression piston 420 and drive piston 410 sweep around this piston attachment mechanism 430 like a paddle wheel.

The present device and method may include only mechanical parts, so it can be easily serviced, does not use batteries, and there is no risk of damaging electronics due to salt water exposure. The device and method are not dependent on some environmental factors that alter the performance of old methods such as salinity, or water oxygen content.

The present device and method allow field adjustability. Various release mechanisms may be used with this device. The materials can be plastic, metal, or any rigid material. A spring could be used in the place of compressible fluid.

The device could be dialed in to take a longer amount of time to release, e.g., one month. Alternatively, the device could be dialed down to take a shorter amount of time to release. The time delay can be adjusted by altering the following properties: viscosity of the viscous element; area of the pistons; compressibility of the compressible element; initial pressure of the compressible element; activation pressure, and/or geometry of the orifices. The viscosity of the viscous element and the area of the drive piston determine how long the release will take.

The present pressure activated time-delayed release device is re-usable since no components are destroyed during its use.

Figure 5:
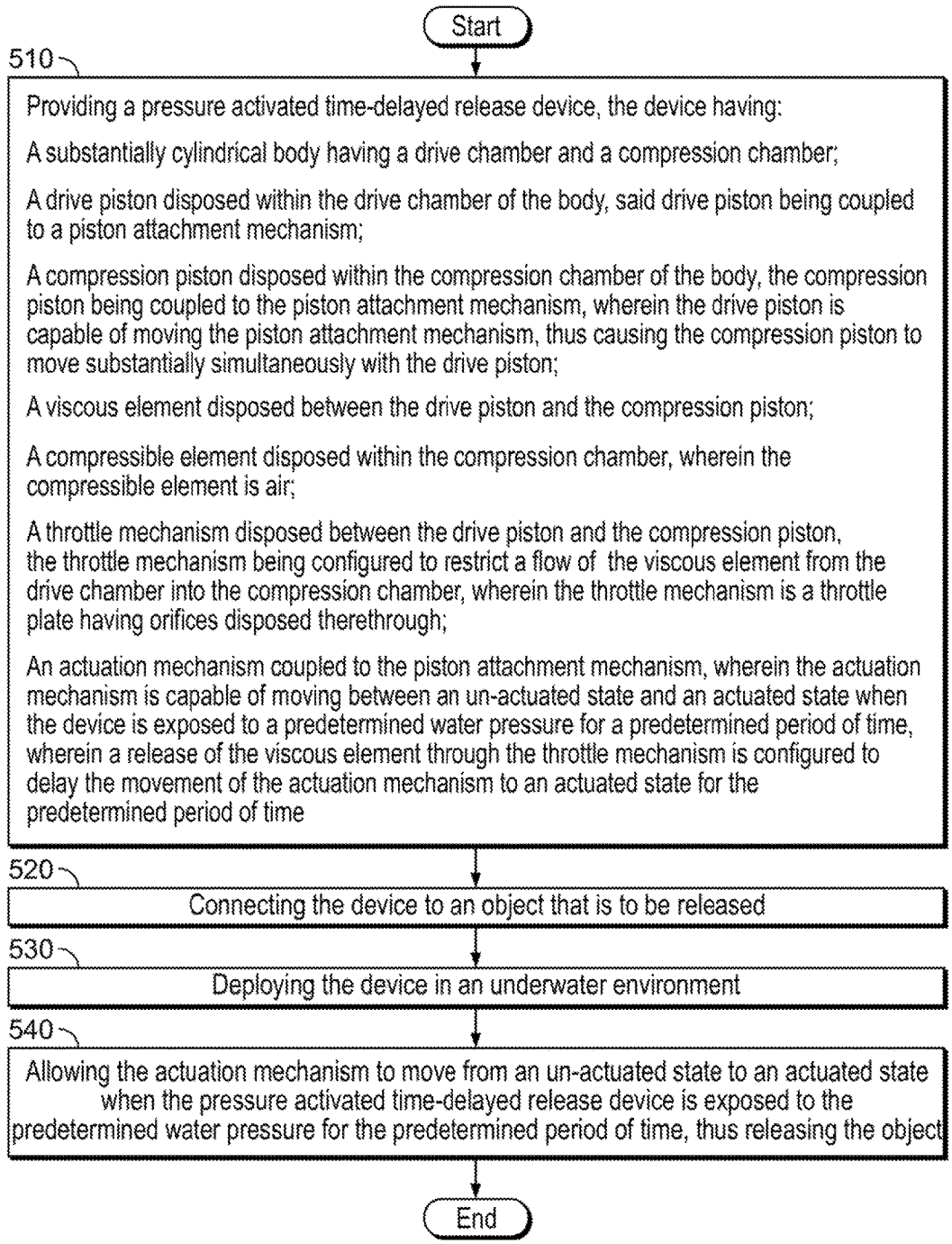
FIG. 5 is a flow chart for a method for a pressure activated time-delayed release, in accordance with one embodiment of the present disclosure.

FIG. 5 is a flow chart for a method for a pressure activated time-delayed release in accordance with one embodiment of the present disclosure. At step 510, the method includes providing a pressure activated time-delayed release device. The device has a substantially cylindrical body having a drive chamber and a compression chamber; and a drive piston disposed within the drive chamber of the body, said drive piston being coupled to a piston attachment mechanism.

The device in step 510 of the method also has a compression piston disposed within the compression chamber of the body, the compression piston being coupled to the piston attachment mechanism. The drive piston is capable of moving the piston attachment mechanism, thus causing the compression piston to move substantially simultaneously with the drive piston.

The device in step 510 of the method also has a viscous element disposed between the drive piston and the compression piston; and a compressible element disposed within the compression chamber. The compressible element is air.

The device in step 510 of the method also has a throttle mechanism disposed between the drive piston and the compression piston. The throttle mechanism is configured to restrict a flow of the viscous element from the drive chamber into the compression chamber. The throttle mechanism is a throttle plate having one or more orifices disposed therethrough.

The device in step 510 of the method also has an actuation mechanism coupled to the piston attachment mechanism, wherein the actuation mechanism is capable of moving between an un-actuated state and an actuated state when the device is exposed to a predetermined water pressure for a predetermined period of time. A release of the viscous element through the throttle mechanism is configured to delay the movement of the actuation mechanism to an actuated for the predetermined period of time.

At step 520, the method includes connecting the device to an object that is to be released. This object may be a line, weight, float, spring or other object that may be submerged, released and recovered.

At step 530, the method includes deploying the device in an underwater environment. The underwater environment can be a subsea environment, ocean environment, lake environment, or any other underwater environment. The device may be deployed by simply lowering it into the body of water. As can be appreciated by one of ordinary skill in the art, other steps may be taken to deploy the device. At step 540, the method includes allowing the actuation mechanism to move from an un-actuated state to an actuated state when the pressure activated time-delayed release device is exposed to the predetermined water pressure for the predetermined period of time, thus releasing the object. The object may be a line, weight, float, spring or other object that may be submerged, released and recovered.

It will be understood that many additional changes in the details, materials, steps and arrangement of parts, which have been herein described and illustrated to explain the nature of the release system, may be made by those skilled in the art within the principle and scope of the invention as expressed in the appended claims.

We claim:

1. A pressure activated time-delayed release device, comprising:
   a body having a drive chamber and a compression chamber;
   a drive piston disposed within the drive chamber of the body, said drive piston being coupled to a piston attachment mechanism;
   a compression piston disposed within the compression chamber of the body, the compression piston being coupled to the piston attachment mechanism, wherein the drive piston is capable of moving the piston attachment mechanism, thus causing the compression piston to move substantially simultaneously with the drive piston;
   a viscous element disposed between the drive piston and the compression piston;
   a compressible element disposed within the compression chamber;
   a throttle mechanism disposed between the drive piston and the compression piston, the throttle mechanism being configured to restrict a flow of the viscous element from the drive chamber into the compression chamber;
   an actuation mechanism coupled to the piston attachment mechanism, wherein the actuation mechanism is capable of moving between an un-actuated state and an actuated state based on a position of the piston attachment mechanism, wherein the actuation mechanism moves to an actuated state when the device is exposed to a predetermined pressure for a predetermined period of time,
   wherein a release of the viscous element through the throttle mechanism is configured to delay movement of the actuation mechanism to an actuated state for the predetermined period of time.

2. The device of claim 1, further comprising:
   a release mechanism coupled to the actuation mechanism, the release mechanism being capable of moving between a closed configuration when the actuation mechanism is in an un-actuated state, and an open configuration when the actuation mechanism is in an actuated state.

3. The device of claim 2, wherein the release mechanism is a pelican hook.

4. The device of claim 1, wherein the body is substantially cylindrical.

5. The device of claim 1, wherein the throttle mechanism is a throttle plate having one or more orifices disposed therethrough.

6. The device of claim 1, wherein the drive piston and the compression piston move in a substantially straight line.

7. The device of claim 6, wherein the throttle mechanism is an external bypass.

8. The device of claim 1, wherein the drive piston and the compression piston move around a central axis.

9. The device of claim 1, wherein the actuation mechanism is a pull actuation mechanism that, when actuated, pulls into the body of the device.

10. The device of claim 1, wherein the actuation mechanism is a push actuation mechanism that, when actuated, extends from the body of the device.

11. The device of claim 1, further comprising:
a lockout mechanism that prevents the actuation mechanism from moving to an actuated state.

12. The device of claim 1, wherein the compressible element is air.

13. A method for pressure activated time-delayed release of an object, the method comprising:
providing a pressure activated time-delayed release device, the device having:
a substantially cylindrical body having a drive chamber and a compression chamber;
a drive piston disposed within the drive chamber of the body, said drive piston being coupled to a piston attachment mechanism;
a compression piston disposed within the compression chamber of the body, the compression piston being coupled to the piston attachment mechanism, wherein the drive piston is capable of moving the piston attachment mechanism, thus causing the compression piston to move substantially simultaneously with the drive piston;
a viscous element disposed between the drive piston and the compression piston;
a compressible element disposed within the compression chamber, wherein the compressible element is air;
a throttle mechanism disposed between the drive piston and the compression piston, the throttle mechanism being configured to restrict a flow of the viscous element from the drive chamber into the compression chamber, wherein the throttle mechanism is a throttle plate having one or more orifices disposed therethrough;
an actuation mechanism coupled to the piston attachment mechanism, wherein the actuation mechanism is capable of moving between an un-actuated state and an actuated state when the device is exposed to a predetermined water pressure for a predetermined period of time,
wherein a release of the viscous element through the throttle mechanism is configured to delay movement of the actuation mechanism to an actuated state for the predetermined period of time;
connecting the device to an object that is to be released;
deploying the device in an underwater environment;
allowing the actuation mechanism to move from an un-actuated state to an actuated state when the pressure activated time-delayed release device is exposed to the predetermined water pressure for the predetermined period of time, thus releasing the object.

14. The method of claim 13, further comprising the step of:
prior to the deploying step, de-activating a lockout mechanism, wherein the pressure activated time-delayed release device includes the lockout mechanism that prevents the actuation mechanism from moving from an un-actuated state to an actuated state.

15. The method of claim 13, wherein the body is substantially cylindrical.

16. A pressure activated time-delayed release device, comprising:
a substantially cylindrical body having a drive chamber and a compression chamber;
a drive piston disposed within the drive chamber of the body, said drive piston being coupled to a piston attachment mechanism;
a compression piston disposed within the compression chamber of the body, the compression piston being coupled to the piston attachment mechanism, wherein the drive piston is capable of moving the piston attachment mechanism, thus causing the compression piston to move substantially simultaneously with the drive piston, wherein the drive piston and the compression piston have substantially the same diameter, wherein the drive piston and the compression piston are substantially aligned;
a viscous element disposed between the drive piston and the compression piston;
a compressible element disposed within the compression chamber, wherein the compressible element is air;
a throttle mechanism disposed between the drive piston and the compression piston, the throttle mechanism being configured to restrict a flow of the viscous element from the drive chamber into the compression chamber, wherein the throttle mechanism is a throttle plate having orifices disposed therethrough;
an actuation mechanism coupled to the piston attachment mechanism, wherein the actuation mechanism is capable of moving between an un-actuated state and an actuated state based on the position of the piston attachment mechanism, wherein the actuation mechanism moves to an actuated state when the device is exposed to a predetermined ocean pressure for a predetermined period of time,
a release mechanism coupled to the actuation mechanism, the release mechanism being capable of moving between a closed configuration when the actuation mechanism is in an un-actuated state, and an open configuration when the actuation mechanism is in an actuated state; and
wherein a release of the viscous element through the throttle mechanism is configured to delay movement of the actuation mechanism from an un-actuated state to an actuated state for the predetermined period of time.

17. The device of claim 16, wherein the actuation mechanism is a pull actuation mechanism that, when actuated, pulls into the body of the device.

18. The device of claim 16, wherein the actuation mechanism is a push actuation mechanism that, when actuated, extends from the body of the device.

19. The device of claim 16, wherein the viscous element is water.

20. The device of claim 16, wherein the compressible element is air.

* * * * *